United States Patent
Ruf et al.

[11] 3,939,655
[45] Feb. 24, 1976

[54] ROTARY PISTON FOUR-STROKE INTERNAL COMBUSTION ENGINE

[75] Inventors: Max Ruf, Obereisesheim; Johannes Steinwart, Bad Friedrichshall II, both of Germany

[73] Assignees: Audi NSU Auto Union Aktiengesellschaft; Wankel GmbH, both of Germany

[22] Filed: Oct. 17, 1974

[21] Appl. No.: 515,645

[30] Foreign Application Priority Data
Oct. 19, 1973 Germany............................ 2352482

[52] U.S. Cl. .................. 60/286; 60/901; 123/8.01; 123/8.45
[51] Int. Cl.[2] ........................................ F02B 75/10
[58] Field of Search ............ 60/901, 286; 123/8.01, 123/8.45

[56] References Cited
UNITED STATES PATENTS
3,791,145  2/1974  Yamamoto .......................... 60/286

Primary Examiner—Douglas Hart
Attorney, Agent, or Firm—Kane, Dalsimer, Kane, Sullivan and Kurucz

[57] ABSTRACT

A rotary piston four-stroke internal combustion engine of trochoid type includes a housing composed of a shell and two parallel end parts together bounding an inner chamber in which a polygonal position is rotatably mounted. Inlet and outlet passages are provided in the housing for supply of air or fresh gas and for ejection of burned gases, respectively. The inlet passage is connected with an intake duct and the outlet passage with an exhaust gas reactor. A line containing a valve leads from the region of the inner chamber in which compression takes place to the exhaust gas reactor.

9 Claims, 5 Drawing Figures

ROTARY PISTON FOUR-STROKE INTERNAL COMBUSTION ENGINE

BACKGROUND OF THE INVENTION

In a known rotary piston internal combustion engine of the type described in U.S. Pat. No. 3,791,145, in order to improve afterburning of unburned exhaust constituents, after cold starting and while running warm from the region under compression of the inner chamber of the engine, fresh gas is introduced into the exhaust gas reactor by way of a line provided for the purpose. At the same time, under the action of the compression pressure or in response to the angular position of the eccentric shaft of the engine, a valve arranged in the line is periodically opened. An additional shut-off means arranged in this line and responding to the operating temperature of the exhaust gas reactor is provided, shutting off the supply of fresh gas when the warm-up phase is ended and the exhaust gas reactor has reached a certain temperature. However, the diversion of fresh gas from the inner chamber entails a diminution of the quantity of available ignitable fresh gas inside the working chamber, and this means a sacrifice of power. Then if during the warm-up phase or shortly after a cold start, a high output demand is placed on the engine, the expected full power will not be available because the shut-off means influenced by the operating temperature of the exhaust gas reactor is still open, permitting withdrawal of frersh gas. The associated loss of charge and consequently power may have adverse effects especially when the engine is used for propulsion of a motor vehicle in road traffic.

SUMMARY OF THE INVENTION

The object of the invention is to control the supply of fresh gas to the exhaust gas reactor in such a way that no impairment of the power of the engine in the cold starting and warm-up phases can occur, if there is an increased output demand.

This object is accomplished, according to the invention, in that the valve is controlled by the negative pressure in the intake duct, so that the line is cleared above a certain amount of negative pressure and shut-off below that value.

The proposal according to the invention thus has the effect that fresh gas to be supplied to the exhaust gas reactor will be withdrawn from the interior chamber of the engine according to the negative pressure in the intake duct, so that upon acceleration and resulting decline of the negative pressure, the line will be shut off, and the full charge will be available for operation of the engine. In such a mode of operation, the quantity of exhaust gas expelled by the engine can sufficiently heat the exhaust gas reactor even without supply of fresh gas.

In a rotary piston four-stroke internal combustion engine having a throttle flap arranged in the intake duct, a negative-pressure line connecting the valve with the intake duct debouches from a point downstream from the closed throttle flap and upstream from the opened throttle flap in the intake duct. The negative pressure prevailing downstream from the closed throttle flap when the engine is running may thus actuate the valve to withdraw fresh gas by way of the negative-pressure line. When the throttle flap is shifted into the interval beyond idling and the partial load range, the negative-pressure line is no longer acted upon by negative pressure, and consequently the valve is closed. This means that upon acceleration, that is, when the throttle is opened sharply and in a phase of high output demand, there will be no loss of charge due to withdrawal of fresh gas. Hence there is no fear of impairment of the required output of the engine.

The rapid heating of the exhaust gas reactor by the fresh gas introduced beginning immediately after the engine is started, may advantageously be limited, since after a certain time the incoming exhaust gases themselves can effectively heat the exhaust gas reactor. Provision is therefore made to arrange in the negative-pressure line, a magnetic valve controlled according to the engine and/or reactor temperature, shutting off the negative-pressure line when a certain temperature is reached. As engine temperature, the oil, coolant or housing temperature may be adopted, and instead of the reactor temperature the temperature of the exhaust gases as a parameter to control the magnetic valve. The proposed solution thus permits supply of fresh gas to the exhaust gas reactor only below a certain temperature and in a range of throttle flap positions corresponding to idling and partial load.

There is another solution, according to which a throttle is provided in the negative-pressure line, and between this throttle and the valve an air line opens into the negative-pressure line. In this air line is arranged a valve connected to the exhaust gas reactor by way of a bimetallic element, gradually opening with rising reactor temperature and gradually closing with falling reactor temperature. In this arrangement also the valve for withdrawal of fresh gas is actuated by way of a negative pressure line, and in this case also the supply of fresh gas to the exhaust gas reactor is possible in a range of throttle flap setting corresponding to idling and partial load and below a certain temperature of the exhaust gas reactor. But the advantage of this solution consists in that, with gradual heating or cooling of the exhaust gas reactor, the valve for withdrawal of fresh gas is influenced in the same direction, and can gradually close or open. Thus the exhaust gas reactor until it reaches its service temperature can be supplied with more or less generous quantities of fresh gas as required for its rapid heating, depending on how warm it gets. In this solution also, instead of the reactor temperature, the temperature of the exhaust gases or the engine temperature, for example the oil or coolant or housing temperature, may be employed to influence the bimetallic element. Another advantage of this arrangement consists in that, after heating of the exhaust gas reactor for rapid regain of the enrichment of the fresh gas with fuel, a connection is established from the air line by way of the valve to the intake duct, so that additional air can enter the intake duct and render the fresh gas leaner, while the quantity of air can be determined by the size of the throttling construction.

To prevent fresh gas from leaking out of the compressing working chamber into the intake working chamber by way of the orifice of the line leading to the reactor, provision is made in a machine whose piston has axially movable sealing pins on its faces, sliding along the faces of the end parts of the housing, that this line shall emanate from a point in an end part face swept by the sealing pins, which thus briefly cover the mouth of the line and prevent communication between compressing and intake working chambers.

In a further refinement of the invention, a check valve and/or at least a screen is arranged in the line leading to the exhaust gas reactor, able to prevent the hot exhaust gases of the reactor from striking back through the line to the valve.

According to another proposal of the invention, it is provided that in a rotary piston four-stroke internal combustion engine of multiple type, the end parts between two neighboring shelves being united to make one intermediate part, the valve is arranged in the intermediate part and has a slide containing two passages each provided with a check valve and each capable of being placed in communication with a neighboring inner chamber. This arrangement has the advantage that by way of a single valve, the withdrawal of fresh gas may be made from two inner chambers. The check valves ensure that the charges of the neighboring inner chambers will not adversely affect each other by transfer of fresh gas. Furthermore, the fresh gas can reach the line and the exhaust gas reactor in considerably smoother flow and with greatly reduced pulsation.

In a further alternative, in a rotary piston four-stroke internal combustion engine with direct injection of fuel into the working chamber that is currently in its compression phase, the line leading to the exhaust gas reactor emanates from a point of the inner chamber that is in communication with the working chamber under compression prior to the injection of fuel. In this version, the air pump that ordinarily delivers supplementary air to the reactor for afterburning of exhaust gases may be omitted, since with the proposed measure, the required air is conveyed directly from the working chamber to the exhaust gas reactor. In this modification, the supply of air may be regulated according to the reactor or exhaust gas temperature of the engine or oil, coolant or housing temperature, as well as the setting of the throttle flap.

The supply of fresh gas or air provided after a cold start and in the warm-up phase for rapid afterburning of unburned exhaust constituents in the exhaust gas reactor may alternatively be controlled for constant oxygen partial pressure by a regulating means.

The withdrawal of fresh gas or air is to take place only after a cold start and in the warm-up phase, and only when idling or under partial load. That is to say, this occurs in operating modes where no very great output demand arises, so that the slight sacrifice of power involved in the withdrawal from the inner chamber can have no adverse effects.

DETAILED DESCRIPTION

Figure 1:
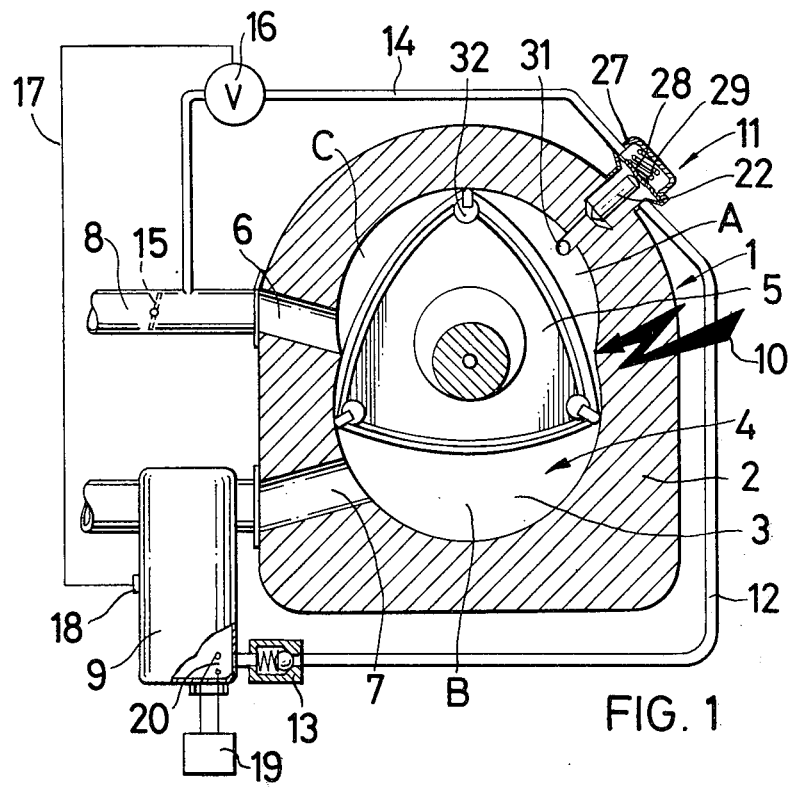
FIG. 1 is a schematic end elevational view, partly in section showing a rotary piston four-stroke internal combustion engine of trochoid type with means according to the invention for controlling supply of fresh gas to the exhaust gas reactor, schematically represented.

The rotary piston four-stroke internal combustion engine shown in FIG. 1 has a housing 1 composed of a shell 2 and two parallel end parts 3 together bounding an inner chamber 4 in which a polygonal piston 5 is rotatably arranged. In the housing 1, the piston 5 forms three working chambers, A, B, C of varying volume, in each of which a four-stroke process is carried out with corresponding phase displacement. For this purpose, the housing 1 is provided with an inlet passage 6 to supply air or fresh gas and an output passage 7 for ejection of burned gases. The inlet passage 6 is connected to an intake duct 8 and the outlet passage 7 to an exhaust gas reactor 9. A spark plug 10 is indicated in this embodiment by way of example by a conventionalized lightning bolt. From the region of the inner chamber 4 in which compression takes place, a line 12 leads by way of a valve 11 to the exhaust gas reactor 9, a check valve 13 being arranged in the line 12. The valve 11 is further connected to the intake duct 8 by a negative-pressure line 14 debouching downstream from the closed throttle flap 15 in intake duct 8. In the negative-pressure line 14, a magnetic valve 16 is provided, connected by way of a cable 17 to a temperature sensor 18 at the exhaust gas reactor. At the mouth of the line 12 into the exhaust gas reactor 9, a vibrator ignition 20 supplied by a spark transformer 19 may be arranged. The orifice 31 of line 12 is located at a point on end part 3 that is swept by the sealing pins 32. The sealing pins 32 thus briefly obstruct the orifice 31, avoiding communication between the compression working chamber A and the working chamber C, which would result in a loss of power.

Figure 2:
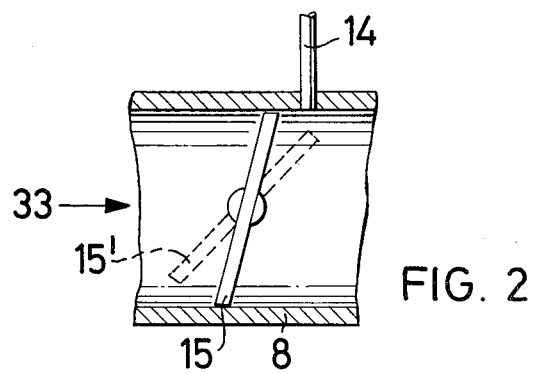
FIG. 2 is a fragmentary sectional view of an intake duct near the throttle flap in FIG. 1.

FIG. 2 shows a portion of the intake duct 8 into which downstream from the closed throttle flap 15 in the direction of the arrow 33, the negative-pressure line 14 opens. The throttle flap position 15' shown dotted indicates the approximate setting beyond which the idling or partial load range is exceeded and the orifice of the negative-pressure line 14 gets out of the region of negative pressure prevailing behind the throttle flap at 15'.

The withdrawal of fresh gas or air to improve afterburning in the exhaust gas reactor then proceeds as follows. Immediately after a cold start of the engine, owing to the negative pressure prevailing in the inlet passage 6 when the throttle flap 15 is closed, the valve 11 is opened by way of the negative-pressure line 14, the slide 22 being lifted by the diaphragm 28 of the chamber 27, overcoming the force of spring 29. Then fresh gas flows from working chamber A which is in the compression phase, into the line 12 and passes by way of the check valve 13 into the exhaust gas reactor 9, thus providing for rapid heating and afterburning of unburned exhaust gas constituents in the reactor 9.

The fresh gas entering the exhaust gas reactor 9 may be ignited by a vibrator ignition 20, the spark transformer 19 supplying the ignition 20 being coupled to a spark interlock not shown and controlled by a time relay or temperature switch, likewise not shown.

When the service temperature of the exhaust gas reactor 9 has been reached, the temperature sensor 18 acts to close the magnetic valve 16, so that the resulting closure of the negative-pressure line 14 causes valve 11 to close. The supply of fresh gas to the exhaust gas reactor 9 is thus cut off. However, the valve 11 can also close if the throttle flap 15 is moved out beyond a position such as that indicated at 15' in FIG. 2, where the negative pressure is no longer operative at the mouth of the negative-pressure line 14 in the intake duct 8 to such an extent as to be able to overcome the force of the spring 29 in the diaphragm chamber 27 of valve 11.

The temperature sensor 18 associated with the magnetic valve 16 need not necessarily be arranged at the exhaust gas reactor, but may be placed in some other location registering the exhaust gas temperature or the engine temperature, so that the magnetic valve 16 will shut off the negative-pressure line 14 when the exhaust gas or engine temperature exceeds a certain value, the said engine temperature being the oil, the coolant or the housing temperature.

Figure 3:
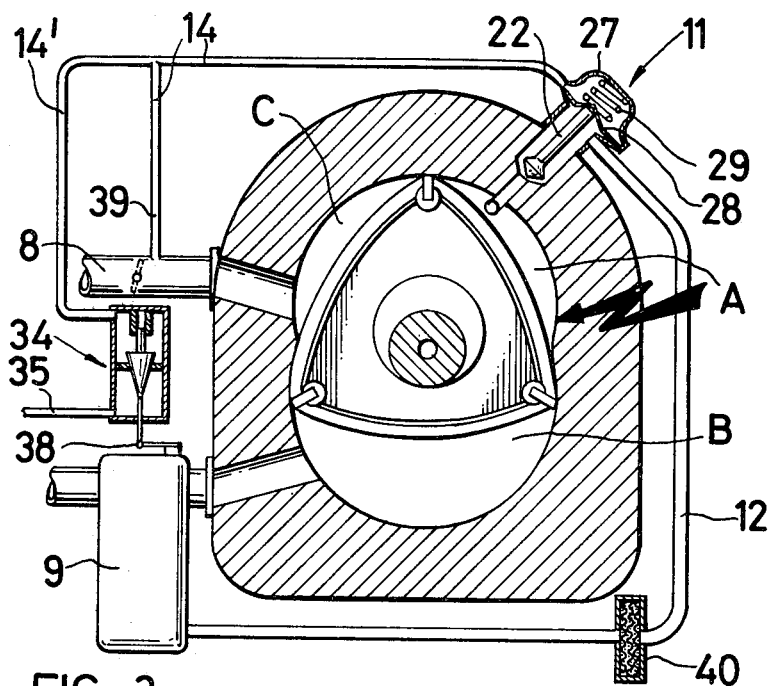
FIG. 3 shows a rotary piston four-stroke internal combustion engine similar to FIG. 1 with means of controlling the supply of fresh gas according to a second embodiment.

In the embodiment shown in FIG. 3, the same reference as in FIG. 1 have been used for like or similar parts. In departure from the embodiment of FIG. 1, and instead of the magnetic valve arrangement, an air line 14' branches off from the negative-pressure line 14. Line 14' is in communication with the atmosphere by way of a valve 34 and a line 35, opening for example into an air filter not shown.

Figure 4:
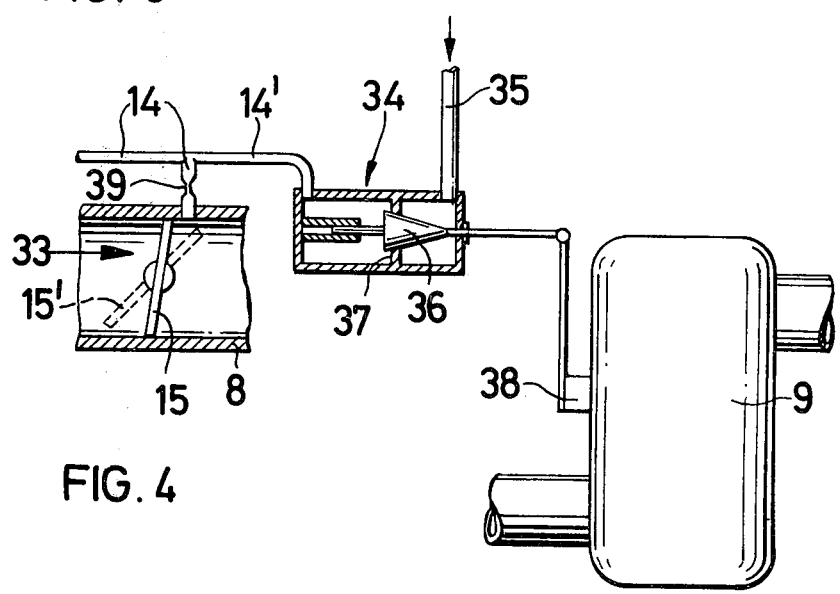
FIG. 4 is a partial view of the control means in FIG. 3.

In the schematic representation of FIG. 4, it may be seen that the cone 36 arranged in valve 34 cooperates with a valve seat 37 and is connected to the exhaust gas reractor 9 by way of a bimetallic element 38. Alternatively, however, the element 38 may be arranged in some other location registering the exhaust gas temperature or the engine temperature, the oil, coolant or housing temperature as the case may be. In the negative-pressure line 14, opening into the intake duct 8 downstream from the closed throttle flap 15 in the direction of the arrow 33, a constriction throttling the cross-section of the line is provided.

In this embodiment by way of example, after a cold start the negative pressure prevailing behind the closed throttle flap 15, by way of the negative pressure line 14 and diaphragm chamber 27, causes valve 11 to open, the slide 22 being lifted by the diaphragm 28 overcoming the force of spring 29. From the working chamber A, which is in the compression phase, fresh gas then flows into line 12 and arrives for example by way of a filter 40 in the exhaust gas reactor 9, thus providing for rapid heating and afterburning of unburned exhaust constituents in reactor 9. The screen 40 is intended to keep the hot exhaust from backfiring into line 12 to valve 11. With rising working temperature of the reactor 9, the bimetallic element 38 effects a gradual opening of the valve cone 36, so that atmospheric air can enter by way of valve seat 37 into air line 14', thus diminishing the negative pressure prevailing in the latter and in the negative-pressure line 14. The result of this is that valve 11 partially closes, allowing a smaller volume of fresh gas to flow into line 12. Since the exhaust gas reactor 9 will heat up very rapidly owing to the fresh gas supply, the valve 34 will eventually be opened completely by the bimetallic element 38, so that the negative pressure in the negative-pressure line 14 is completely broken and valve 11 closes under the action of spring 29. The negative pressure in the negative-pressure line 14, however, will likewise be broken if the range of idling and partial load is exceeded, more or less corresponding to the dotted position 15' of the throttle flap.

With exhaust gas reactor 9 heated up, the intake duct 8 is in communication with the atmosphere by way of negative-pressure line 14 and air line 14' as well as open valve 34 and line 35, so that with throttle flap 15 closed for example, supplementary air can be supplied to the engine by this route, to render the fresh gas leaner under the influence of the reactor temperature. Thus the flow of supplementary air supplied to intake duct 8 can be determined by appropriate size of the throttling constriction 39. Alternatively, however, instead of the constriction 39, a suitably narrow pipe section may be installed. With exhaust gas reactor 9 cold or half warm, and valve 34 therefore closed, of course no supplementary air can enter intake duct 8 by way of air line 14' when the throttle flap 15 is closed, so that the elimination of the supplementary air may bring about a change in mixture ratio in the direction of enriching the fresh gas with fuel.

Figure 5:
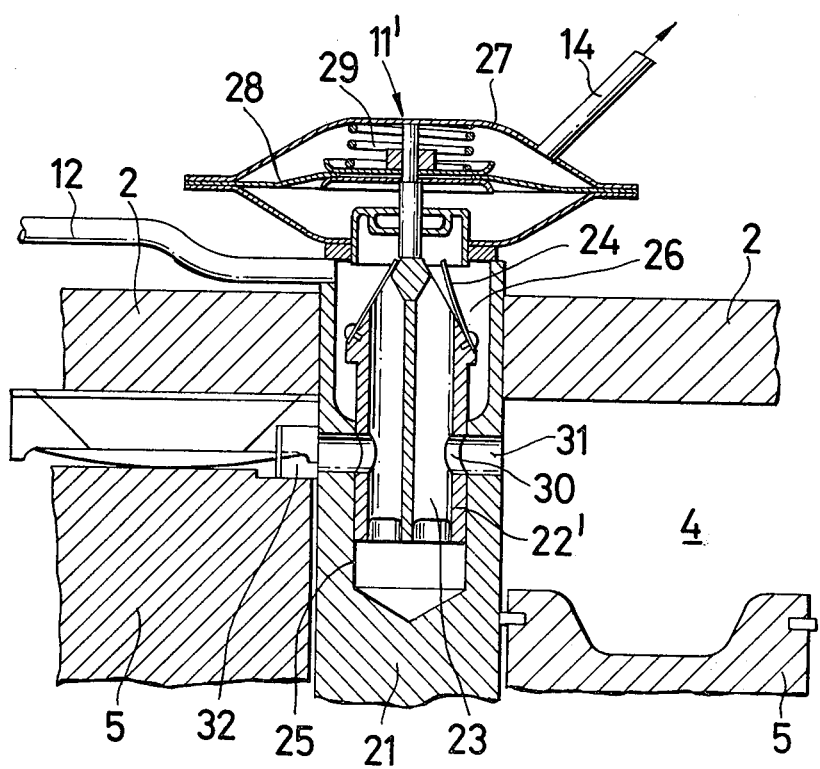
FIG. 5 is a longitudinal section of a valve for withdrawal of fresh gas, arranged in the intermediate part of a double rotary piston engine.

FIG. 5 shows a valve 11' enlarged for a rotary piston internal combustion engine of double type, in which the end parts 3 between two neighboring shells 2 have been united in an intermediate part 21, and the valve 11' is arranged in the intermediate part 21. The valve 11' consists essentially of a slide 22' having two separate passages 23 each provided with a check valve 24. Slide 22' travels in a bore 25 adjoined radially outward by a chamber 26 into which the passages 23 with check valves 24 in slide 22' open and from which the line 12 emanates. At its upper or outer end (as in the drawing) the slide 22' extends into a diaphragm chamber 27 sealed off from chamber 26, and is there attached to a diaphragm 28 acted upon by a spring 29 pressing the slide 22' radially inward. In the representation shown, however, negative pressure acts by way of the negative-pressure line 14, so that the slide 22' is lifted and its lateral passage ports 30 clear the orifices 31 in the sides of the intermediate part 21. The orifices 31 are arranged as before, at a point on the end wall swept by the sealing pins 32 of pistons 5.

In this lifted position of slide 22', fresh gas flows in valve 11' alternately by way of orifices 31 in intermediate part 21 and the lateral ports 30, through passages 23 and by way of the check valves 24 of slide 22' into chamber 26 and thence into line 12 and on to the exhaust gas reactor 9. At the same time, the check valves 24 of slide 22' prevent transfer of fresh gas in either direction through the system of passages of slide 22' into the other inner chamber 4.

Thus the several aforenoted objects and advantages are most effectively attained. Although several somewhat preferred embodiments have been disclosed and described in detail herein, it should be understood that this invention is in no sence limited thereby and its scope is to be determined by that of the appended claims.

What is claimed is:

1. A rotary piston four-stroke internal combustion engine of the trochoid type having a housing composed of a shell and two parallel end parts together bounding an inner chamber, a polygonal piston being rotatably arranged in the chamber, inlet and outlet passages being provided in the housing, respectively, for supply of air or fresh gas and for ejection of burned gases, the inlet passage being connected with an intake duct and the output passage with an exhaust gas reactor, a line leading from the region of the inner chamber where compression is taking place to the exhaust gas reactor, a valve being arranged in said line, the valve being controlled by the negative pressure in the intake duct in such a way that the line is cleared above a certain negative pressure and shut off below that value.

2. A rotary piston four-stroke internal combustion engine according to claim 1, wherein a throttle flap is arranged in the intake duct, a negative-pressure line connects the valve with the intake duct and emanates from a point in the intake duct located downstream from the closed throttle flap and upstream from the opened throttle flap.

3. A rotary piston four-stroke internal combustion engine according to claim 2, wherein in the negative-pressure line a magnetic valve controlled according to the engine and/or reactor temperature is arranged, which magnetic valve shuts off the negative-pressure line when a certain temperature is reached.

4. A rotary piston four-stroke internal combustion engine according to claim 2, wherein in the negative-pressure line a throttling constriction is provided, and between said constriction and the valve an air line opens into the negative-pressure line, in which air line is arranged a valve connected to the exhaust gas reactor by way of a bimetallic element, which latter valve gradually opens with rising reactor temperature and gradually closes with falling reactor temperature.

5. A rotary piston four-stroke internal combustion engine according to claim 1, wherein the piston on its faces bears axially movable sealing pins sliding along the walls of the end parts of the housing, the line leading to the exhaust gas reactor emanates from a point in the wall of an end part which point is swept by the sealing pins.

6. A rotary piston four-stroke internal combustion engine according to claim 1, wherein in the line leading to the exhaust gas reactor a check valve is arranged.

7. A rotary piston four-stroke internal combustion engine according to claim 1, wherein in the line leading to the exhaust gas reactor a screen is arranged.

8. A rotary piston four-stroke internal combustion engine according to claim 1, wherein the engine is of multiple type, the end parts between two neighboring shells being united into one intermediate part, the valve is arranged in the intermediate part and has a slide containing two separate passages each provided with a check valve, each of which passages is capable of being brought into communication with an adjoining inner chamber.

9. A rotary piston four-stroke internal combustion engine according to claim 1, wherein means are provided for direct injection of the fuel into the working chamber which is in the compression phase, the line leading to the exhaust gas reactor emanates from a point of the inner chamber which point is in communication with the working chamber that is under compression prior to injection of the fuel.

* * * * *

UNITED STATES PATENT OFFICE
CERTIFICATE OF CORRECTION

PATENT NO. : 3,939,655
DATED : February 24, 1976
INVENTOR(S) : MAX RUF and JOHANNES STEINWART It is certified that error appears in the above-identified patent and that said Letters Patent are hereby corrected as shown below:

Column 1, line 30, "frersh" should be --fresh--;

Column 2, line 56, "construction" should be --constriction--;

Column 5, line 27, "reractor" should be --reactor--;

Column 6, line 50, "sence" should be --sense--;

Column 6, line 62, "output" should be --outlet--.

Signed and Sealed this fourth Day of May 1976

[SEAL]

Attest:

RUTH C. MASON
*Attesting Officer*

C. MARSHALL DANN
*Commissioner of Patents and Trademarks*